United States Patent

Stapleton

[11] Patent Number: 5,845,829
[45] Date of Patent: Dec. 8, 1998

[54] PUSH BUTTON STANCHION LATCH OPERATOR WITH CAMMED HOOK

[75] Inventor: Craig A. Stapleton, Troy, Mich.

[73] Assignee: Advanced Accessory Systems LLC, Sterling Heights, Mich.

[21] Appl. No.: 907,749

[22] Filed: Aug. 8, 1997

Related U.S. Application Data

[63] Continuation of Ser. No. 535,741, Sep. 28, 1995, abandoned.

[51] Int. Cl.$^6$ .................................................... B60R 9/045
[52] U.S. Cl. ............................................ 224/321; 224/326
[58] Field of Search .................................... 224/321, 325, 224/326, 329, 330, 331

[56] References Cited

U.S. PATENT DOCUMENTS

| | | |
|---|---|---|
| 3,837,547 | 9/1974 | Joos ......................................... 224/331 |
| 4,877,168 | 10/1989 | Bott . |
| 5,014,893 | 5/1991 | Morley . |
| 5,082,158 | 1/1992 | Bott ......................................... 224/321 |
| 5,203,483 | 4/1993 | Cucheran . |
| 5,232,138 | 8/1993 | Cucheran . |
| 5,385,285 | 1/1995 | Cucheran et al. . |

Primary Examiner—Linda J. Sholl
Attorney, Agent, or Firm—Rader, Fishman & Grauer PLLC

[57] ABSTRACT

An article carrier for a motor vehicle comprises a stanchion latch operator for a stanchion that supports the end of a crossbar on a side rail of the luggage carrier. The stanchion latch operator comprises a stanchion body having a side rail jaw a crossbar holder and latch chamber. The latch body fits within the latch chamber and includes a button flange as well as a lever with a hooked end. A pivot mount supports the latch body in the latch chamber about a pivot axis and is biased toward a latched position by a spring. The latch body includes a cam surface meeting with a shoulder on an upper chamber to displace the hooked end perpendicular to the pivot axis as the button flange is pivoted about the pivot axis.

9 Claims, 3 Drawing Sheets

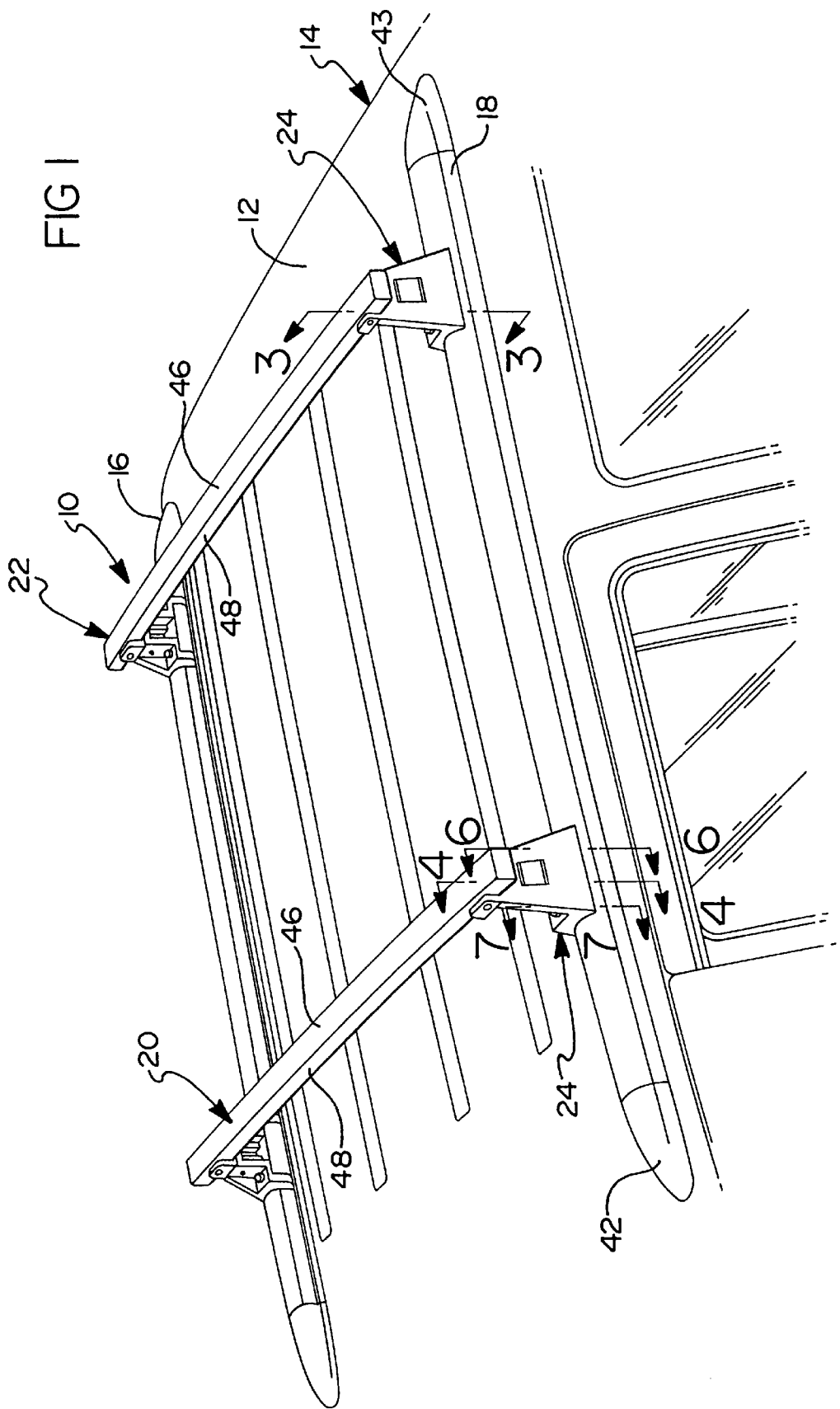

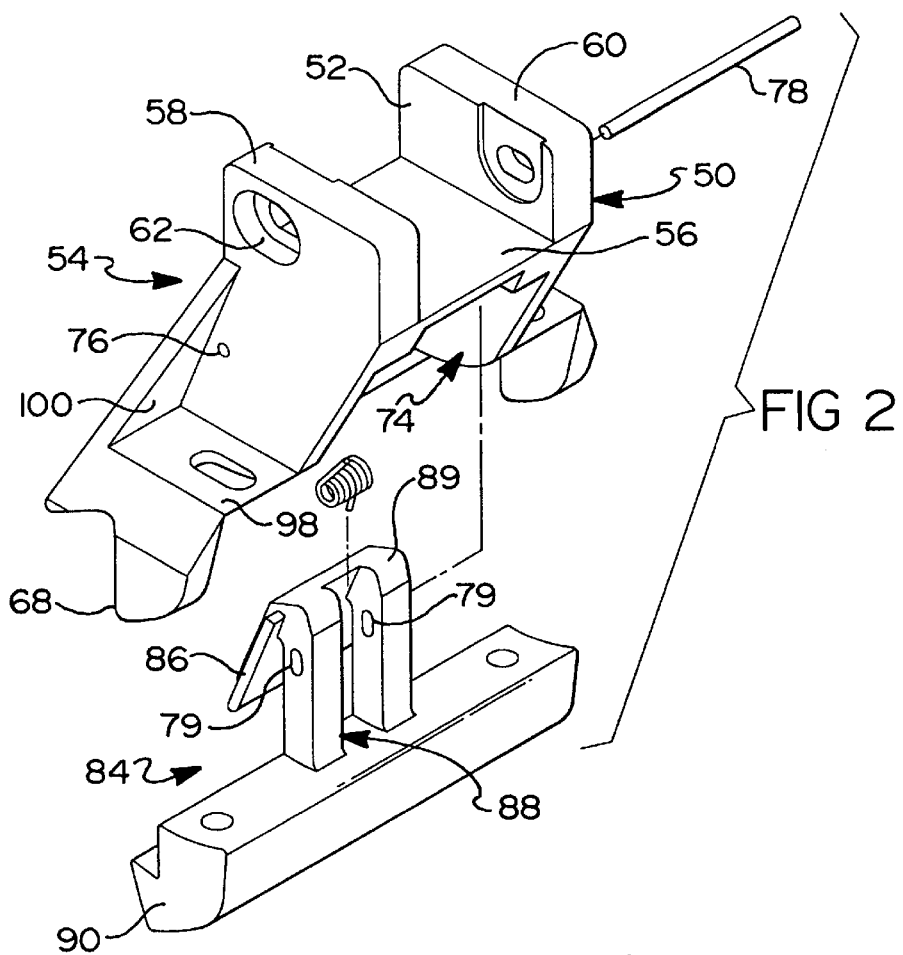
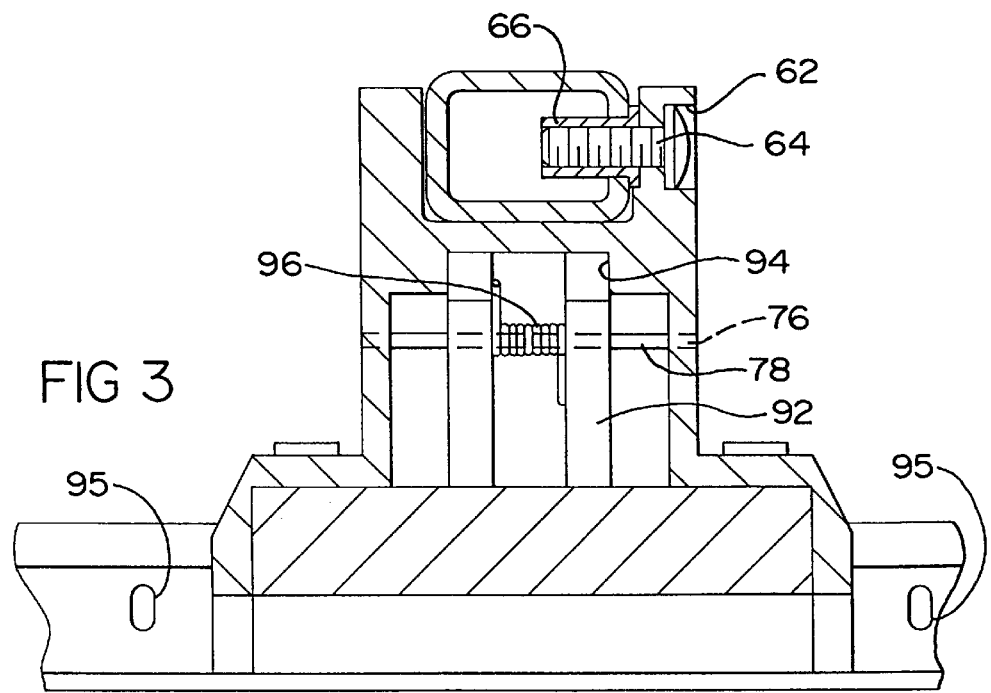

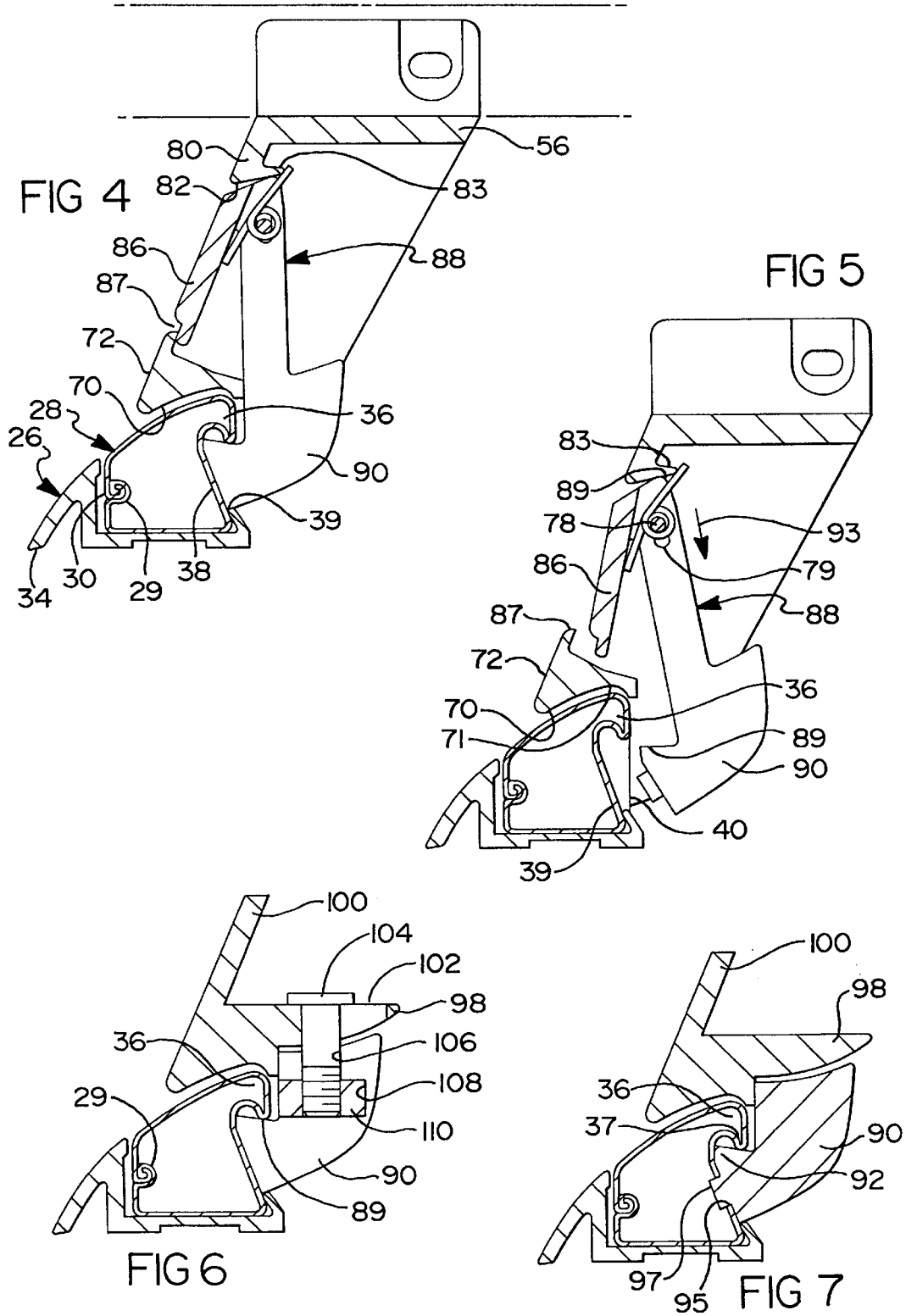

PUSH BUTTON STANCHION LATCH OPERATOR WITH CAMMED HOOK

This application is a continuation of application Ser. No. 08/535,741 filed on Sep. 28, 1995 now abandoned.

BACKGROUND OF THE INVENTION

1. Field of the Present Invention

The present invention relates generally to article carriers for motor vehicles having a pair of side rails and at least one crossbar carried by stanchions for support upon the side rails, and more particularly to the stanchion latch actuator for releasably securing the stanchion in a fixed position along the side rail in which the latch actuator comprises a push button pivotally displacing a cammed lever with a hooked end.

2. Background Art

A large number of previously known article carriers for mounting on motor vehicles include stanchions for supporting crossbars upon a pair of side rails. In addition, the stanchions often include latches that releasably engage the side rail to permit removal or relocation of the position of the crossbar along the side rail. Unfortunately, the latches and the actuators for the latches are often multiple piece assemblies that must be manufactured and assembled in numerous operations that increase the complexity and expense of the article carrier.

In addition, the previously known stanchion latches must meet particular performance standards. For example, the load carrying requirements for article carriers must be met despite torque loads or other forces that tend to displace the stanchion along the side rail. In addition, the stanchions must resist removal as a result of forces such as aerodynamic lift that can affect the position of the crossbars along the side rails. Moreover, distortion or deformation of the stanchion and the latch members can substantially reduce the strength of the clamping force that attaches the stanchion to the side rail.

In addition, previously known latch actuators that are strong enough to lock the stanchions to the side rails under a variety of loads may interfere with the styling of the article carrier and the vehicle on which it is carried. Accordingly, some previously known latch actuators are in the form of handles hidden along the inboard side of the stanchions so that they are hidden from exposure exteriorly of the luggage carrier. However, such positioning of the mechanism can increase the difficulty in accessing and manipulating the latch, and therefore interfere with adjustment of the article carrier when a user is attempting to adjust its size as desired. Moreover, the protrusion of actuators outside of the boundary of the stanchion body can interfere with the positioning or securement of the load being carried by the article carrier or lashing can interfere with operation of the actuator.

SUMMARY OF THE PRESENT INVENTION

The present invention overcomes the above mentioned disadvantages by providing an article carrier stanchion latch operator for displacing a movable jaw with respect to an article carrier side rail lip, the operator having a stanchion body with a latch chamber that carries a latch body comprising a button flange, a lever with a hooked end and a cam surface meeting with a shoulder on an upper chamber wall. As a result, the present invention provides a latch actuator that will displace the hooked end perpendicular to the pivot axis as the button flange is pivoted about the pivot axis. Accordingly, the latch actuator is substantially simpler than previously known stanchion latch operating mechanisms without sacrificing strength and rigidity and retaining the crossbar in a selected position along the side rails of the article carrier.

The present invention also provides an article carrier with crossbars supported by a pair of stanchions on a pair of side rails, each stanchion having a stanchion body with a side rail jaw and a movable jaw operated by a button latch mechanism having a hook. The latch actuator comprises a latch body pivotally secured in a latch chamber of the stanchion body and includes a button flange mounted to a pivot lever with a hooked end. Preferably, the latch body includes a button flange formed in one piece with the lever and is supported by a pivot mount for pivotally supporting the latch body in the latch chamber about a pivot axis. A cammed surface on the latch body mates with a shoulder on the upper chamber wall to displace the hooked end perpendicular to the pivot axis as the latch body pivots about the pivot axis.

In the preferred embodiment, the latch body comprises a button flange and a lever with a hooked end made in one piece, the hooked end forming a displaceable jaw. The latch body is carried by a pivot mount, preferably a pivot pin pivotally mounted on the latch body in the stanchion body latch chamber. A spring biases the latch body toward an engaged position at which the displaceable jaw is engaged under a lip of the side rail and forcing the side rail jaw of the stanchion body against the jaw support surface on the side rail. Preferably, the jaw support surface is concealed inboard of the side rail finished external surface. In the engaged position, the button flange is positioned closely adjacent the outboard surface of the stanchion body and exposed through a chamber opening in the stanchion body. Preferably, the spring comprises a coil spring concentrically wound about the pin to urge the latch body to the engaged position.

Preferably, the stanchion body is also made in one piece including a side rail jaw, a crossbar holder and a latch chamber having an opening exposed to the outboard side of the stanchion. The preferred combination of the one piece latch body and a one piece stanchion renders the apparatus substantially simpler to assemble than previously known stanchion latch operating mechanisms. Moreover, the reduced number of pieces to be made and assembled, as well as the reduced number of components subjected to stresses and distortions under load, improves the retention of the stanchion and crossbar assembly on the side rails of the article carrier.

Thus the present invention provides improved styling and simplicity in construction of an article carrier stanchion latch operator compared to previously known article carriers. In addition, movement of the latch body is simplified and provides positive clamping engagement without introducing joints or connections between components that must be displaced to engage the clamping jaw against the article carrier side rail. In addition, the present invention provides a latch operator that is easily accessed and manipulated by the user without sacrificing the strength and stability for interconnection of the components of the article carrier under load conditions.

BRIEF DESCRIPTION OF THE DRAWING

The present invention will be more clearly understood by reference to the following detailed description of the preferred embodiment when read in conjunction with the accompanying drawing in which like reference characters refer to like parts throughout the views and in which:

FIG. 1 is a perspective view of an article carrier mounted to a motor vehicle in accordance with the present invention;

FIG. 2 is an enlarged exploded perspective view of the stanchion shown in the article carrier in FIG. 1;

FIG. 3 is an enlarged sectional view taken substantially along the line 3—3 in FIG. 1;

FIG. 4 is an enlarged sectional view taken substantially along the line 4—4 in FIG. 1;

FIG. 5 is an enlarged sectional view similar to FIG. 4 but showing the latch body in a different operating position;

FIG. 6 is an enlarged sectional view taken substantially along the line 6—6 in FIG. 1; and FIG. 7 is an enlarged sectional view taken substantially along the line 7—7 in FIG. 1.

DETAILED DESCRIPTION OF THE PREFERRED EMBODIMENT

Referring first to FIG. 1, an article carrier 10 according to the present invention is thereshown mounted to a roof panel 12 of a motor vehicle 14. The article carrier 10 includes a pair of side rails 16 and 18 and a pair of crossbars 20 and 22. Each crossbar is supported by a pair of stanchions 24, preferably each stanchion 24 being constructed in accordance with the present invention as described below.

Each side rail 16 and 18 is an elongated rail, preferably formed by tubing, bar stock or rolled steel construction molding, extruding, or a composite or combination of materials, built for strength in supporting a load along substantially its entire length. In the preferred embodiment, the side rail is a composite made of an extruded plastic pad 26, as best shown in FIGS. 4–7, and a slide rail structure 28, shown as a rolled sheet structure closed by a knurled and overlapping rolled seam 29 that forms a tube lockingly received in a channel 30 of the pad 26. The rail member 28 has an exterior surface 32 which is configured to overlap and match the contour of an exterior surface wall 34 of pad 26. The exterior surface 32 and the exterior surface of the wall 34 are typically finished surfaces that have been coated, painted or the like to contribute to the styling and appearance of the article carrier 10 on the motor vehicle 14. The pad wall 34 covers the rolled seam 29 of the rail 28.

Beneath the exterior surface 32, the rail member 28 includes an overhanging lip 36 and an undercut recessed portion 38 where portions of the rail member 28 and the pad 26 are interlockingly joined as shown diagrammatically at 39. The support surfaces 32 of the rail is adapted to engage a jaw portion 70 of the stanchion 24, including a curved portion, to support the stanchion above the vehicle 12. However, an alternative jaw support surface 39 (FIG. 4) could enable the exterior surface 32 to be relieved or spaced apart from engagement with adjacent surfaces on the stanchion 24 that could mar or scrape the finish surfaces 32 or finish surfaces on 34 on the rails 16 and 18. In addition, the rails 16 and 18 may include tapering end caps 42 and 43 as shown in FIG. 1 to stylize the appearance of the elongated side rails 16 and 18.

Referring again to FIG. 1, the crossbars 20 and 22 may be of similar construction to the side rails formed by tube stock, bar stock or other molded configurations or rolled sheet metals to form a rail 44. In the preferred embodiment, the crossbar rails 44 are formed as rectangular tubular rails to provide flat support surfaces 46 and vertical positioning surfaces 48 for articles to be loaded and carried as the rails 44 are held by the stanchions 24.

Each stanchion 24 includes a crossbar holder 50. In the preferred embodiment, the holder 50 comprises a channel 52 formed at the upper end of the stanchion body 54 and shaped to receive the rail 44. The channel wall 56 supports the bottom of the crossbar rail, while side walls 58 and 60 engage a flat surface 48 of the rail of crossbars 20 and 22. Each side wall 58 and 60 includes a counter-bored retainer opening 62 adapted to receive a fastener 64. A recess nut 66 is retained in the crossbars 20 and 22 as shown in FIG. 3. Each of the openings 62 is offset from the opening in the opposite rail wall so that fasteners 64 are spaced along the length of the crossbar to resist bending and distortion of the cross rail 44 when the crossbars 20 and 22 are loaded.

The stanchion body 54 also includes a fixed jaw 40 adapted to rest against the jaw support surface 39 of a side rail. As best shown in FIGS. 4–7, the jaw surface 40 positions the conforming surface 70 near to but spaced apart from the exterior surface 32 of the side rail. As a result, while the exterior surface 72 may be finished by painting, coating or the like in the same manner as the surface 32 of the side rail, engagement between the stanchion and the side rail at the stationary jaw and jaw support surface remains hidden from exposure to the exterior of the luggage carrier.

In addition, the stanchion body 54 also includes a latch chamber 74. As best shown in FIGS. 4–7, the wall 56 also forms the upper wall of the latch chamber 74. Extended portions of the side walls 58 and 60 include openings 76 adapted to receive a pivot pin 78. The wall 56 includes a depending shoulder 80 (FIG. 4) with a continuation of the exterior surface 72, and including a cam follower surface 82 for mating engagement with the latch body 84 as will be discussed below.

The pivot pin 78 supports a latch body 84 carried by the stanchion body 54. The latch body 84 includes a button flange 86 angled with respect to a lever 88 having a hook end 90 that forms a jaw. The lever 88 includes a pair of spaced legs 92 that fit within a shouldered area 94 below the wall 56 (FIG. 3). The pivot pin 78 is received through elongated openings 79 in the latch body 84 through the legs 92. The spacing between the legs 92 carries a spring in the form of a coiled spring 96 wound about the pin 78. As best shown in FIGS. 4 and 5, elongated ends of the spring 96 bear against the button flange 86 and an inboard lip 83 on the shoulder 80 to bias the hook 90 to the position shown in solid line in FIG. 4.

As shown in FIG. 6, the hook 90 can be locked under the lip 36 at flanges 98 (FIGS. 6,7) extending laterally from the sidewalls 58 and 60 enclosing the latch chamber 74. The flanges 98 are reinforced by gusset walls 100 (FIGS. 2,7) to provide rigid support for the jaw surface 70, particularly at curved abutment surface 71 (FIG. 5), carried on a side wall adjacent the flange 98. Flange 98 also includes aperture 102 adapted to receive a fastener 104 that is also received in a registering aperture 106 in the hook 90. The hook 90 also includes a recess 108 (FIG. 6) adapted to receive a nut 110 for threaded engagement with the fastener 104. As the threaded fastener 104 is engaged within the nut 110, the jaw 90 is locked in a latched position beneath the lip 36 of the side rail.

When the locking fasteners 104 have been removed from the registering apertures in the flange 98 and the jaw 90, the latch body 84 can be pivoted about the axis of the pivot pin 78 within the latch chamber 74. As best shown in FIGS. 4 and 5, the spring 96 normally retains the button flange 86 against the periphery of an exterior opening 87 communicating with the latch chamber 74. A rear opening enables the latch body 84 to be installed in the chamber 74. When the button flange 86 is displaced by an operator pressing against the button to displace it toward the position shown in FIG. 5, the cam surface 89 at the top of the lever 88 engages the shoulder surface 82 to displace the lever 88 downwardly in the direction of arrow 93 shown in FIG. 5. The displacement along arrow 93 is perpendicular to the axis of the pin 78 to lower the lip 99 below the depending lip 36 of the side rail as shown in FIG. 5.

Conversely, pivotal displacement back toward the position shown in FIG. 4 enables the inclined surface 91 (FIGS. 5 & 6) of hook 90 to slide up into overlapping engagement with the lower edge of the depending flange 37 of lip 36 so that lips 99 and 37 (FIG. 7) overlap as shown in detail in FIG. 7. Moreover, the latch hook 90 can then be locked in that position as shown in FIG. 6. Moreover, the upper edge of the rail jaw support surface 32 will tightly engage the jaw surface 70, preferably at curved surface 71, to stably support the stanchion and crossbar on the rail as the spring resiliently urges the latch body toward the position shown in FIG. 4. Moreover, as shown in FIG. 3 and in FIG. 7, a plurality of elliptical openings 95 along the rails 16 and 18 receive correspondingly shaped protrusions 97 on the jaw hook 90 to register the stanchion in a desired fixed position along the rail.

Having thus described the present invention, many modifications thereto will become apparent to those skilled in the art to which it pertains without departing from the scope and spirit of the present invention as defined in the appended claims.

What is claimed is:

1. A stanchion latch operator for displacing a movable jaw with respect to an article carrier side rail lip comprising:

a stanchion body having a side rail jaw, a crossbar holder and a latch chamber partly defined by an upper chamber wall, a latch body comprising a button flange and a lever with a slot and a hooked end that forms a displaceable jaw, and a pivot pin located in said slot for pivotally supporting said latch body in said latch chamber about a pivot axis, wherein said pivot pin has a longitudinal axis that coincides with said pivot axis; and wherein said latch body includes a cam surface mating with a shoulder on an upper chamber wall to displace said hooked end perpendicular to said pivot axis as said button flange is pivoted about said pivot axis.

2. The invention as defined in claim 1 wherein latch body comprises a single piece of material.

3. The invention as defined in claim 2 wherein said stanchion body is a single piece housing.

4. The invention as defined in claim 3, further comprising a coil spring concentrically wound around said pivot pin.

5. The invention as defined in claim 1 wherein said stanchion includes a chamber opening facing outboard of the article carrier, and said button flange is exposed through said chamber opening.

6. An article carrier comprising:

a pair of side rails, each side rail having a jaw support surface and a lateral lip, a crossbar, a stanchion at each end of said crossbar; each stanchion having a stanchion body with a side rail jaw adapted to engage said jaw support surface, a crossbar holder engagable with said crossbar and a latch chamber for carrying a latch actuator, each latch actuator including a latch body carried by each stanchion in said chamber and including a button flange and a lever with a slot and a hooked end, a pivot mount for pivotally supporting said latch body in said latch chamber about a pivot axis, said pivot mount including a pivot pin having a longitudinal axis that coincides with said pivot axis;

a cam surface on said latch body mating with a shoulder on an upper chamber wall to displace said latch body along said slot such that said hooked end moves perpendicular to said pivot axis as said latch body pivots about said pivot axis.

7. The invention as defined in claim 5 wherein latch body comprises a single piece of material.

8. The invention as defined in claim 6 wherein said stanchion body is a single piece housing.

9. An article carrier comprising:

a pair of side rails, each side rail having a jaw support surface and a lateral lip, a crossbar, a stanchion at each end of said crossbar; each stanchion having a stanchion body with a side rail jaw adapted to engage said jaw support surface, a crossbar holder engagable with said crossbar and a latch chamber for carrying a latch actuator, each latch actuator including a latch body carried by each stanchion in said chamber and including a button flange and a lever with a slot and a hooked end, a pivot mount for pivotally supporting said latch body in said latch chamber about a pivot axis, said pivot mount including a pivot pin having a longitudinal axis that coincides with said pivot axis;

a cam surface on said latch body mating with a shoulder on an upper chamber wall to displace said latch body along said slot such that said hooked end moves perpendicular to said pivot axis as said latch body pivots about said pivot axis; and a coil spring concentrically wound about said pivot pin to bias said latch body relative to said stanchion.

* * * * *